US012198840B2

United States Patent

(12) United States Patent
Lan et al.

(10) Patent No.: US 12,198,840 B2
(45) Date of Patent: Jan. 14, 2025

(54) RARE EARTH PERMANENT MAGNET MATERIAL AND RAW MATERIAL COMPOSITION,PREPARATION METHOD THEREFOR AND USE THEREOF

(71) Applicant: FUJIAN GOLDEN DRAGON RARE-EARTH Co., Ltd., Fujian (CN)

(72) Inventors: Qin Lan, Fujian (CN); Jiaying Huang, Fujian (CN); Zhixing Xie, Fujian (CN); Weiguo Mou, Fujian (CN); Qingfang Huang, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 326 days.

(21) Appl. No.: 17/600,102

(22) PCT Filed: Jul. 22, 2020

(86) PCT No.: PCT/CN2020/103430
§ 371 (c)(1),
(2) Date: Sep. 30, 2021

(87) PCT Pub. No.: WO2021/017967
PCT Pub. Date: Feb. 4, 2021

(65) Prior Publication Data

US 2022/0165462 A1 May 26, 2022

(30) Foreign Application Priority Data

Jul. 31, 2019 (CN) ......................... 201910701203.6

(51) Int. Cl.
*H01F 1/057* (2006.01)
*B22F 3/24* (2006.01)
(Continued)

(52) U.S. Cl.
CPC .............. *H01F 1/0577* (2013.01); *B22F 9/04* (2013.01); *C22C 33/0278* (2013.01);
(Continued)

(58) Field of Classification Search
None
See application file for complete search history.

(56) References Cited

U.S. PATENT DOCUMENTS

2019/0172615 A1 6/2019 Doto et al.
2020/0013529 A1* 1/2020 Nakamura .............. C22C 38/14

FOREIGN PATENT DOCUMENTS

CN 103805827 A 5/2014
CN 104064346 A 9/2014
(Continued)

OTHER PUBLICATIONS

Li, Vacuum, vol. 125, p. 21-25. (Year: 2016).*
(Continued)

*Primary Examiner* — Xiaowei Su
(74) *Attorney, Agent, or Firm* — Houston Beshining Law Office PLLC; Liangang Ye

(57) ABSTRACT

A rare earth permanent magnet material and a raw Material composition, a preparation method therefor and use thereof. The rare earth permanent magnet material comprises the following components in percentage by mass: 29.0-32.0 wt. % of R, where R comprises RH, and the content of RH is greater than 1 wt. %; 0.30-0.50 wt. % of Cu (not including 0.50 wt. %); 0.10-1.0 wt. % of Co; 0.05-0.20 wt. % of Ti; 0.92-0.98 wt. % of B; and the remainder being Fe and unavoidable impurities; wherein R is a rare-earth element and at least comprises Nd; and RH is a heavy rare-earth element and at least comprises Tb. The R-T-B system permanent magnet material exhibits excellent performance,
(Continued)

wherein Br≥14.30 kGs, and Hcj≥24.1 kOe. The invention can synchronously improve Br and Hcj.

11 Claims, 2 Drawing Sheets

(51) Int. Cl.

| | |
|---|---|
| ***B22F 9/04*** | (2006.01) |
| ***C22C 33/02*** | (2006.01) |
| ***C22C 38/00*** | (2006.01) |
| ***C22C 38/10*** | (2006.01) |
| ***C22C 38/14*** | (2006.01) |
| ***C22C 38/16*** | (2006.01) |
| ***H01F 41/02*** | (2006.01) |

(52) U.S. Cl.
CPC ............ *C22C 38/005* (2013.01); *C22C 38/10* (2013.01); *C22C 38/14* (2013.01); *C22C 38/16* (2013.01); *H01F 41/0253* (2013.01); *B22F 2009/044* (2013.01); *B22F 2301/355* (2013.01); *C22C 2202/02* (2013.01)

(56) References Cited

FOREIGN PATENT DOCUMENTS

| | | | |
|---|---|---|---|
| CN | 105655076 | A | 6/2016 |
| CN | 108831650 | A | 11/2018 |
| CN | 109585111 | A | 4/2019 |
| CN | 109935432 | A | 6/2019 |
| CN | 110428947 | A | 11/2019 |
| CN | 110517838 | A | 11/2019 |
| CN | 111326306 | A | 6/2020 |
| WO | 9717709 | A1 | 5/1997 |

OTHER PUBLICATIONS

Machine translation of CN 103805827A. (Year: 2014).*
Sep. 28, 2020 International Search Report issued in International Patent Application No. PCT/CN2020/103430.
Sep. 28, 2020 Written Opinion of the International Searching Authority issued in International Patent Application No. PCT/CN2020/103430.
Nov. 7, 2021 First Office Action issued in Taiwan application No. 109125073.

* cited by examiner

RARE EARTH PERMANENT MAGNET MATERIAL AND RAW MATERIAL COMPOSITION,PREPARATION METHOD THEREFOR AND USE THEREOF

The present application is a National Stage of International Application No. PCT/CN2020/103430, filed on Jul. 22, 2020, which claims the priority of Chinese Patent Application CN201910701203.6 filed on Jul. 31, 2019, the contents of which are incorporated herein by reference in their entireties.

TECHNICAL FIELD

The present disclosure relates to rare earth permanent magnet material and raw material composition, preparation method therefor and use thereof.

BACKGROUND

R-T-B based rare earth permanent magnetic materials are widely used in modern industry and electronics, such as electronic computers, automatic control systems, electric motors and generators, nuclear magnetic resonance cameras, audio devices, material separation devices, communication equipment and many other fields. With the development of new applications and the harsh and changing application conditions, the demand for products with high coercivity is increasing.

At present, it is generally possible to enhance the intrinsic coercivity (referred to as Hcj) of magnets by adding medium and heavy rare earths such as Dy and Tb to the formulation of R-T-B based rare earth permanent magnetic materials, but the medium and heavy rare earths enter the main phase and replace Pr and Nd partially to form DyFeB or TbFeB. The saturation magnetization intensity of DyFeB or TbFeB is significantly lower than that of NdFeB, which leads to a decrease in the residual magnetic flux density (remanence, referred to as Br) and low utilization of Dy and Tb in the main phase, and because Dy and Tb are very expensive, the product cost increases significantly, and it is not conducive to the comprehensive and efficient utilization of the heavy rare earth elements Dy and Tb, which are lacking in resource reserves.

Studies have also shown that other resource-rich elements can be used to increase the Hcj of magnet, for example, Cu, Ga (forming $R_6$-$T_{13}$-Ga phase), Al and other raw materials can be added to the formulation of R-T-B based rare earth permanent magnet materials to improve the Hcj of magnets, but the liquid phase of these elements has a low melting point, and the sintering temperature is low to prevent abnormal growth of grain and the sintering denseness is poor, resulting in low Br of the permanent magnet materials; for another example, Ti can be added to the formulation of R-T-B based rare earth permanent magnet materials to improve the Hcj of magnets, but the formulation is prone to form a Ti-rich phase with high melting point, which leads to the deterioration of the grain boundary diffusion effect and is not conducive to the improvement of Hcj of magnets.

It can be seen that, in the existing formulations, Br and Hcj are usually in a trade-off relationship, and the improvement of Hcj will sacrifice part of Br, and it is difficult to maintain the two at a high level simultaneously. Therefore, how to obtain an R-T-B based rare earth permanent magnet material with high Hcj and high Br is a problem to be solved urgently in this field.

Content of the Present Invention

The technical problem to be solved in the present disclosure is for overcoming the defects of the prior art in which the Br and Hcj of the R-T-B based rare-earth permanent magnet materials are difficult to achieve simultaneous improvement, and thus a rare-earth permanent magnet material and a raw material composition, a preparation method therefor and a use thereof are provided. The R-T-B based permanent magnet material of the present invention has excellent performance with Br≥14.30 kGs and Hcj≥24.1 kOe, which achieves the simultaneous improvement of Br and Hcj. Compared with the conventional formulations, 0.30 wt. % or more of Cu and 0.05-0.20 wt. % of Ti are added in the R-T-B based permanent magnet material in the present invention, part of Ti enters the grain boundary to form high-Cu-rich-Ti phase, and these phases can be completely dissolved in the grain boundary diffusion, which is beneficial to the grain boundary diffusion, and Hcj is substantially it proved.

The present disclosure provides an R-T-B based permanent magnet material, wherein, the R-T-B based permanent magnet material comprises the following components in percentage by mass:

29.0-32.0 wt. % of R, where R comprises RH, and the content of RH is greater than 1 wt. %;

0.30-0.50 wt. % of Cu, not including 0.50 wt. %;

0.10-1.0 wt. % of Co;

0.05-0.20 wt. % of Ti;

0.92-0.98 wt. % of B;

and the remainder being Fe and unavoidable impurities; wherein:

R is a rare-earth element, and R at least comprises Nd;

RH is a heavy rare earth element, and RH at least comprises Tb.

In the present disclosure, R can further comprise a rare earth element which is conventional in the art, for example Pr.

In the present disclosure, the content of R is preferably 29.5-32.0 wt. %, for example 30.05 wt. %, 31.05 wt. %, 31.06 wt. %, 31.07 wt. %, 31.3 wt. %, or 31.56 wt. %, and wt. % refers to the mass percentage in the R-T-B based permanent magnet material.

In the present disclosure, RH can further comprise a heavy rare earth element which is conventional in the art, for example Dy.

In the present disclosure, the content of RH is preferably 1.05-1.30 wt. %, for example 1.05 wt. %, 1.06 wt. %, 1.07 wt. % or 1.30 wt. %, and wt. % refers to the mass percentage in the R-T-B based permanent magnet material.

When RH further comprises Dy, preferably, the content of Tb is 0.5 wt. %, the content of Dy is 0.8 wt. %, and wt. % refers to the mass percentage in the R-T-B based permanent magnet material.

In the present disclosure, the content of Cu is preferably 0.30-0.45 wt. %, for example 0.30 wt. %, 0.35 wt. %, 0.40 wt. % or 0.45 wt. %, and wt. % refers to the mass percentage in the R-T-B based permanent magnet material.

In the present disclosure, the content of Co is preferably 0.10 wt. % or 0.50-1.0 wt. %, for example 0.50 wt. %, 0.80 wt. % or 1.0 wt. %, and wt. % refers to the mass percentage in the R-T-B based permanent magnet material.

In the present disclosure, the content of Ti is preferably 0.05 wt. % or 0.10-0.20 wt. %, for example 0.10 wt. %, 0.15 wt. % or 0.20 wt. %, and wt. % refers to the mass percentage in the R-T-B based permanent magnet material.

In the present disclosure, the content of 13 is preferably 0.92-0.96 wt. % or 0.94-0.98 wt. %, for example 0.92 wt. %, 0.94 wt. %, 0.95 wt. % or 0.98 wt. %, and wt. % refers to the mass percentage in the R-T-B based permanent magnet material.

In a preferred embodiment of the present disclosure, the R-T-B based permanent magnet material comprises the following components.

29.5-32.0 wt. % of R, and the RI-1 having a content of 1.05-1.3 wt. %;

0.30-0.45 wt. % of Cu;

0.50-1.0 wt. % of Co;

0.10-0.20 wt. % of Ti;

0.92-0.96 wt. % of B;

and wt. % refers to the mass percentage in the R-T-B based permanent magnet material.

In a preferred embodiment of the present disclosure, the R-T-B based permanent magnet material comprises the following components: 29.0 wt. % of Nd, 1.05 wt. % of Tb, 0.30 wt. % of Cu, 0.10 wt. % of Co, 0.05 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.05 wt. % of Tb, 0.30 wt. % of Cu, 0.10 wt. % of Co, 0.05 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.5 wt. % of Nd, 1.06 wt. % of Tb, 0.30 wt. % of Cu, 0.10 wt. % of Co, 0.05 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.05 wt. % of Tb, 0.35 wt. % of Cu, 0.50 wt. % of Co, 0.10 wt. % of 0.92 wt. % of B, and the remainder being Fe, and wt. % refers to the mass percentage in the R-T-B based permanent magnet material.

In a preferred embodiment of the present disclosure, the based permanent magnet material comprises the following components: 30.0 wt. % of Nd, 1.07 wt. % of Tb, 0.40 wt. % of Cu, 0.50 wt. % of Co, 0.10 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.06 wt. % of Tb, 0.45 wt. % of Cu, 0.50 wt. % of Co, 0.10 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.06 wt. % of Tb, 0.40 wt. % of Cu, 0.8 wt. % of Co, 0.10 wt. % of Ti, 0.92 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.07 wt. % of Tb, 0.40 wt. % of Cu, 1.0 wt. % of Co, 0.05 wt. % of Ti, 0.94 wt. % of and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.06 wt. % of Tb, 0.40 wt. % of Cu, 1.0 wt. % of Co, 0.10 wt. % of Ti, 0.94 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.05 wt. % of Tb, 0.40 wt. % of Cu, 1.0 wt. % of Co, 0.15 wt. % of Ti, 0.94 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.05 wt. % of Tb, 0.40 wt. % of Cu, 1.0 wt. % of Co, 0.20 wt. % of Ti, 0.94 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.06 wt. % of Tb, 0.40 wt. % of Cu, 1.0 wt. % of Co, 0.10 wt. % of Ti, 0.95 wt. % of B, and the remainder being Fe, and wt. % refers to the mass percentage in the R-T-B based permanent magnet material.

In a preferred embodiment of the present disclosure, the R-T-B based permanent magnet material comprises the following components: 30.0 wt. % of Nd, 1.05 wt. % of Tb, 0.40 wt. % of Cu, 1.0 wt. % of Co, 0.10 wt. % of Ti, 0.98 wt. % of B, and the remainder being Fe, and wt. % refers to the mass percentage in the R-T-B based permanent magnet material.

In a preferred embodiment of the present disclosure, the R-T-B based permanent magnet material comprises the following components: 30 wt. % of PrNd, 0.5 wt. % of Tb, 0.8 wt. % of Dy, 0.40 wt. % of Cu, 0.5 wt. % of Co, 0.1 wt. % of Ti, 0.92 wt. % of B, and the remainder being Fe, and wt. % refers to the mass percentage in the R-T-B based permanent magnet material.

In the present disclosure, the R-T-B based permanent magnet material has a high-Cu-high-Ti phase with composition ratio of $(T_{1-a-b}—Ti_a—Cu_b)_x—R_y$ at grain boundary of the magnet; wherein: T represents Fe and Co, 1.5b<a<2b, 70 at %<x<82 at %, 18 at %<y<30 at %.

In the present disclosure, at % refers to the atomic percentage, specifically refers to the percentage of the atomic content of each element in the R-T-B based permanent magnet material.

Wherein, the a may be in the range of 2.50-3.0 at %.

Wherein, the y may be in the range of 20.0-23.0 at %.

The present disclosure further provides a raw material composition of an R-T-B based permanent magnet material comprising the following components in percentage by mass:

79.0-31.5 wt. % of R, wherein R comprises RH, and the content of RH is 0.1-0.9 wt. %;

0.30-0.50 wt. % of Cu, not including 0.50 wt. %;

0.10-1.0 wt. % of Co;

0.05-0.20 wt. % of Ti;

0.92-0.98 wt. % of B;

and the remainder being Fe and unavoidable impurities;

wherein:

R is a rare earth element, and R at least comprises Nd; and RH is a heavy rare earth element.

In the present disclosure, R can further comprise a rare earth element which is conventional in the art, for example Pr.

In the present disclosure, the content of R is preferably 29.5-31.0 wt. %, for example 29.5 wt. %, 30.5 wt. %, 30.8 wt. % or 31.0 wt. %, and wt. % refers to the mass percentage in the raw material composition of R-T-B based permanent magnet material.

In the present disclosure, RH may be heavy rare earth elements which are conventional in the art, for example Tb and/or Dy.

In the present disclosure, the content of RH is preferably 0.5-0.9 wt. %, for example 0.5 wt. % or 0.8 wt. %, and wt. % refers to the mass percentage in the raw material composition of R-T-B based permanent magnet material.

In the present disclosure, the content of Cu is preferably 0.30-0.45 wt %, for example 0.30 wt. %, 0.35 wt. %, 0.40 wt. % or 0.45 wt. %, and wt. % refers to the mass percentage in the raw material composition of R-T-B based permanent magnet material.

In the present disclosure, the content of Co is preferably 0.10 wt. % or 0.50-1.0 wt. %, for example 0.50 wt. %, 0.80 wt. % or 1.0 wt. %, and wt. % refers to the mass percentage in the raw material composition of R-T-B based permanent magnet material.

In the present disclosure, the content of Ti is preferably 0.05 wt. % or 0.10-0.20 wt. %, for example 0.10 wt. %, 0.15 wt. % or 0.20 wt. %, and wt. % refers to the mass percentage in the raw material composition of R-T-B based permanent magnet material.

In the present disclosure, the content of 13 is preferably 0.92-0.96 wt. % or 0.94-0.98 wt. %, for example 0.92 wt. %, 0.94 wt. %, 0.95 wt. % or 0.98 wt. %, and wt. % refers to the mass percentage in the raw material composition of R-T-B based permanent magnet material.

In a preferred embodiment of the present, disclosure, the raw material composition of the R-T-B based permanent magnet material comprises the following components:

29.5-31.0 wt. % of R, 0.5-0.9 wt. % of RH;

0.30-0.45 wt. % of Cu;

0.50-1.0 wt. % of Co;

0.10-0.20 wt. % of Ti;

0.92-0.96 wt. % of B;

and wt. % refers to the mass percentage in the raw material composition of R-T-B based permanent magnet material.

In a preferred embodiment of the present disclosure, the R-T-B based permanent magnet material comprises the following components: 29.0 wt. % of Nd, 0.50 wt. % of Tb, 0.30 wt. % of Cu, 0.10 wt. % of Co, 0.05 wt. % of Ti and 0.92 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.30 wt. % of Cu, 0.10 wt. % of Co, 0.05 wt. % of Ti, 0.92 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.5 wt. % of Nd, 0.50 wt. % of Tb, 0.30 wt. % of Cu, 0.10 wt. % of Co, 0.05 wt. % of Ti, 0.92 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.35 wt % of Cu, 0.50 wt. % of Co, 0.10 wt. % of Ti, 0.92 wt % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 0.50 wt. % of Co, 0.10 wt. % of Ti, 0.92 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: Nd of 30.0 wt. %, Tb of 0.50 wt. %, Cu of 0.45 wt. %, Co of 0.50 wt. %, Ti of 0.10 wt. %, B of 0.92 wt. %, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 0.8 wt. % of Co, 0.10 wt. % of Ti, 0.92 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.05 wt. % of Ti, 0.94 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.10 wt. % of Ti, 0.94 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.15 wt. % of Ti, 0.94 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.20 wt. % of Ti, 0.94 wt. % of and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.10 wt. % of Ti, 0.95 wt. % of and the remainder being Fe, and wt. % refers to the mass percentage in the raw material composition of R-T-B based permanent magnet material.

In a preferred embodiment of the present disclosure, the R-T-B based permanent magnet material comprises the following components: 30.0 wt. % of Nd, 0.50 wt. % of Tb, 0.40 wt. % of Cu, 1.0 wt. % of Co, 0.10 wt. % of Ti, 0.98 wt. % of B, and the remainder being Fe, and wt. % refers to the mass percentage in the raw material composition of R-T-B based permanent magnet material.

In a preferred embodiment of the present disclosure, the R-T-B based permanent magnet material comprises the following components: 30 wt. % of PrNd, 0.8 wt. % of Dy, 0.40 wt. % of Cu, 0.5 wt. % of Co, 0.1 wt. % of Ti, 0.92 wt. % of B, and the remainder being F e, and wt. % refers to the mass percentage in the raw material composition of R-T-B based permanent magnet material.

The present disclosure further provides a preparation method for an R-T-B based permanent magnet material, which comprises the following steps: the molten liquid of the raw material composition of R-T-B based permanent magnet material is subjected to casting, decrepitation, pulverization, forming, sintering, and grain boundary diffusion treatment, and the R-T-B based permanent magnet material is obtained;

the heavy rare earth elements in the grain boundary diffusion treatment comprise Tb.

In the present disclosure, the molten liquid of the raw material composition of R-T-B based permanent magnet material can be prepared by conventional methods in the art, for example, by melting in a high-frequency vacuum induction inciting furnace. The vacuum degree of the melting furnace can be $5\times10^{-2}$ Pa. The temperature of the melting can be 1500° C. or less.

In the present disclosure, the process of the casting can be a conventional casting process in the art, for example: cooling in an Ar gas atmosphere (e.g. in an Ar gas atmosphere of $5.5\times10^{4}$ Pa) at a rate of $10^{2}$° C./sec-$10^{4}$° C./sec.

In the present disclosure, the process of the decrepitation can be a conventional decrepitation process in the art, for example, being subjected to hydrogen absorption, dehydrogenation and cooling treatment.

Wherein, the hydrogen absorption can be carried out under the condition of a hydrogen pressure of 0.15 MPa.

Wherein, the dehydrogenation can be carried out under the condition of heating up while vacuum-pumping.

In the present disclosure, the process of the pulverization can be a conventional pulverization process in the art, for example jet mill pulverization.

Wherein, the jet mill pulverization can be carried out under a nitrogen atmosphere with an oxidizing gas content of 150 ppm or less. The oxidizing gas refers to content of oxygen or moisture.

Wherein, the pressure in the pulverizing chamber of the jet mill pulverization can be 0.38 MPa.

Wherein, the time for the jet mill pulverization can be 3 hours.

Wherein, after the pulverization, a lubricant, for example zinc stearate, can be added according to conventional means in the art. The addition amount of the lubricant can be 0.10-0.15%, for example 0.12%, by weight of the mixed powder.

In the present disclosure, the process of the forming can be a conventional forming process in the art, for example a magnetic field forming method or a hot pressing and hot deformation method.

In the present disclosure, the process of sintering can be a conventional sintering process in the art, for example, preheating, sintering and cooling under vacuum conditions (e.g. under a vacuum of $5\times10^{-3}$ Pa).

Wherein, the temperature of preheating can be 300-600° C., The time of preheating can be 1-2 h. Preferably, the preheating is performed for 1 h at a temperature of 300° C. and 600° C., respectively.

Wherein, the temperature of sintering can be a conventional sintering temperature in the art, for example 900° C.-1100° C., and for another example 1040° C.

Wherein, the time of sintering can be a conventional sintering time in the art, for example 2 h.

Wherein, the cooling can be preceded by passing Ar gas to bring the air pressure to 0.1 MPa.

In the present disclosure, the grain boundary diffusion treatment can be carried out by a process conventional in the art, for example, substance containing Tb is attached to the surface of the R-T-B based permanent magnet material by evaporating, coating or sputtering, and then diffusion heat treatment is carried out.

Wherein, the substance containing Tb can be a Tb metal, a Tb-containing compound or an alloy.

Wherein, the temperature of the diffusion heat treatment can be 800-900° C., for example 850° C.

Wherein, the time of the diffusion heat treatment can be 12-48 h, for example 24 h.

Wherein, after the grain boundary diffusion treatment, heat treatment can be further performed. The temperature of the heat treatment can be 450-550° C., for example 500° C. The time of the heat treatment can be 3 h.

The present disclosure further provides an R-T-B based permanent magnet material prepared by the aforementioned preparation method.

The present disclosure further provides a use of the R-T-B based permanent magnet material as an electronic component in a motor.

Wherein, the use can be a use as an electronic component in a motor with a motor speed of 3000-7000 rpm and/or a motor operating temperature of 80-180° C., or it can also be a use as an electronic component in a high-speed motor and/or household appliances.

The high-speed motor is generally a motor with a speed of more than 10,000 r/min.

The household appliances can be inverter air conditioners.

Based on the common sense in the field, the preferred conditions of the preparation methods can be combined arbitrarily to obtain preferred examples of the present disclosure.

The reagents and raw materials used in the present disclosure are commercially available.

The positive progress of the present invention is as follows:

(1) The R-T-B based permanent magnet material in the present disclosure has excellent performance with Br≥14.30 kGs and Hcj≥24.1 kOe, achieving simultaneous improvement of Br and Hcj.

(2) Compared with the conventional formulation, 0.30 wt. % or more of Cu and 0.05-0.20 wt. % of Ti are added in the R-T-B based permanent magnet material in the present disclosure, and part of Ti enters the grain boundary to form high-Cu-rich-Ti phase, which can be completely dissolved in the grain boundary diffusion and is beneficial to the grain boundary diffusion, and the Hcj is greatly improved.

DETAILED DESCRIPTION OF THE PREFERRED EMBODIMENT

Figure 1:
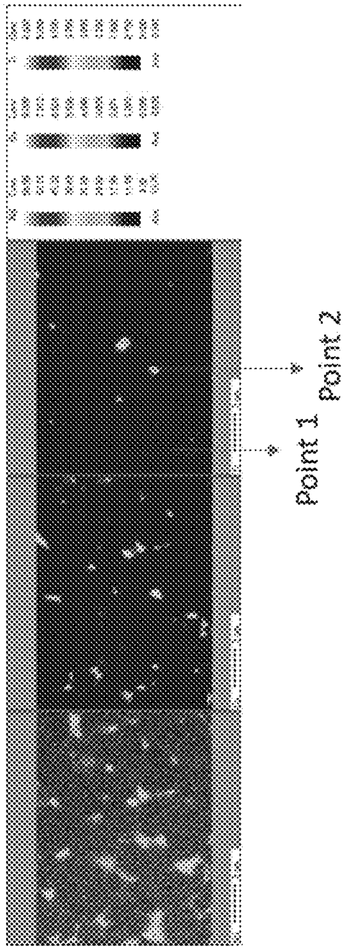
FIG. 1 shows the distribution diagrams of Nd, Cu, and Ti elements formed by FE-EPMA surface scan of the permanent magnet material prepared in Example 7 (from left to right are the concentration distribution diagrams of Nd element, Cu element, and Ti element, and the legend indicates that different colors correspond to different concentration values), wherein point 1 is the main phase and point 2 is the high-Cu-rich-Ti phase.

The following examples further illustrate the present disclosure, but the present disclosure is not limited thereto. Experiment methods in which specific conditions are not indicated in the following embodiments are selected according to conventional methods and conditions, or according to the product specification.

In the following examples and comparative examples, the purity of Nd and Tb is 99.8%, the purity of Fe—B is industrial grade purity, the purity of pure Fe is industrial grade purity, and the purity of Co, Cu, and Ti is 99.9%.

The formulations of the R-T-B based permanent magnet materials in the examples and the comparative examples are shown in Table 1. The wt. % in Table 1 and the later Table 3 refers to the mass percentage of each raw material in the R-T-B based permanent magnet material, and “\” indicates that the element was not added.

The R-T-B based permanent magnet materials were prepared as follows:

(1) Melting process: according to the formulations shown in Table 1, the prepared raw materials were put into a crucible made of alumina and vacuum melted in a high-frequency vacuum induction melting furnace and in a vacuum of $5\times10^{-2}$ Pa at a temperature of 1500° C. or less.

(2) Casting process: after vacuum melting, the melting furnace was fed with Ar gas to make the air pressure reach 55,000 Pa and then casting was carried out, and a cooling rate of $10^{2}$° C./sec-$10^{4}$° C./sec was used to obtain the quench alloy.

(3) Hydrogen decrepitation process: the furnace for hydrogen decrepitation with quench alloy placed therein was evacuated at room temperature, and then hydrogen gas of 99.9% purity was passed into the furnace for hydrogen decrepitation to maintain the hydrogen pressure at 0.15 MPa; after sufficient hydrogen absorption, it was sufficiently dehydrogenated by heating up while vacuum-pumping; then it was cooled and the powder after hydrogen decrepitation was taken out.

(4) Micro-pulverization process: the powder after hydrogen decrepitation was pulverized by jet mill for 3 hours in nitrogen atmosphere with oxidizing gas content of 1.50 ppm or less and under the condition of the pressure of 0.38 MPa in the pulverization chamber, and fine powder was obtained. The oxidizing gas refers to oxygen or moisture.

TABLE 1

Formulations for the raw material compositions of the R-T-B based permanent magnet materials (wt. %)

| No. | Nd | PrNd | Tb | Dy | Cu | Co | Ti | B | Fe | Ga | Al | Zr | Mo | W | Mn |
|---|---|---|---|---|---|---|---|---|---|---|---|---|---|---|---|
| Example 1 | 29.0 | / | 0.50 | / | 0.30 | 0.10 | 0.05 | 0.92 | remainder | / | / | / | / | / | / |
| Example 2 | 30.0 | / | 0.50 | / | 0.30 | 0.10 | 0.05 | 0.92 | remainder | / | / | / | / | / | / |
| Example 3 | 30.5 | / | 0.50 | / | 0.30 | 0.10 | 0.05 | 0.92 | remainder | / | / | / | / | / | / |
| Example 4 | 30.0 | / | 0.50 | / | 0.35 | 0.50 | 0.10 | 0.92 | remainder | / | / | / | / | / | / |
| Example 5 | 30.0 | / | 0.50 | / | 0.40 | 0.50 | 0.10 | 0.92 | remainder | / | / | / | / | / | / |
| Example 6 | 30.0 | / | 0.50 | / | 0.45 | 0.50 | 0.10 | 0.92 | remainder | / | / | / | / | / | / |
| Example 7 | 30.0 | / | 0.50 | / | 0.40 | 0.80 | 0.10 | 0.92 | remainder | / | / | / | / | / | / |
| Example 8 | 30.0 | / | 0.50 | / | 0.40 | 1.0 | 0.05 | 0.94 | remainder | / | / | / | / | / | / |
| Example 9 | 30.0 | / | 0.50 | / | 0.40 | 1.0 | 0.10 | 0.94 | remainder | / | / | / | / | / | / |
| Example 10 | 30.0 | / | 0.50 | / | 0.40 | 1.0 | 0.15 | 0.94 | remainder | / | / | / | / | / | / |
| Example 11 | 30.0 | / | 0.50 | / | 0.40 | 1.0 | 0.20 | 0.94 | remainder | / | / | / | / | / | / |
| Example 12 | 30.0 | / | 0.50 | / | 0.40 | 1.0 | 0.10 | 0.95 | remainder | / | / | / | / | / | / |
| Example 13 | 30.0 | / | 0.50 | / | 0.40 | 1.0 | 0.10 | 0.98 | remainder | / | / | / | / | / | / |
| Example 14 | / | 30 | / | 0.8 | 0.4 | 0.5 | 0.10 | 0.92 | remainder | / | / | / | / | / | / |
| Comparative Example 1 | 28.0 | / | 0.50 | / | 0.30 | 0.10 | 0.05 | 0.92 | remainder | / | / | / | / | / | / |
| Comparative Example 2 | 32.0 | / | 0.50 | / | 0.30 | 0.10 | 0.05 | 0.92 | remainder | / | / | / | / | / | / |
| Comparative Example 3 | 30.0 | / | 0.50 | / | 0.20 | 0.50 | 0.10 | 0.92 | remainder | / | / | / | / | / | / |
| Comparative Example 4 | 30.0 | / | 0.50 | / | 0.50 | 0.50 | 0.10 | 0.92 | remainder | / | / | / | / | / | / |
| Comparative Example 5 | 30.0 | / | 0.50 | / | 0.50 | 0.30 | 0.25 | 0.92 | remainder | / | / | / | / | / | / |
| Comparative Example 6 | 30.0 | / | 0.50 | / | 0.40 | 0.30 | 0.05 | 0.89 | remainder | / | / | / | / | / | / |
| Comparative Example 7 | 28.0 | / | 0.50 | / | 0.40 | 0.10 | 0.20 | 0.92 | remainder | 0.30 | 0.20 | / | / | / | / |
| Comparative Example 8 | 30.0 | / | 0.50 | / | 0.40 | 0.10 | / | 0.92 | remainder | / | / | 0.20 | / | / | / |
| Comparative Example 9 | 30.0 | / | 0.50 | / | 0.40 | 0.10 | / | 0.92 | remainder | / | / | / | 0.20 | / | / |
| Comparative Example 10 | 30.0 | / | 0.50 | / | 0.40 | 0.10 | / | 0.92 | remainder | / | / | / | / | 0.20 | / |
| Comparative Example 11 | / | 29.1 | / | 0.5 | 0.20 | 2.0 | / | 0.9 | remainder | 0.20 | 0.20 | 0.15 | / | / | 0.03 |

(5) Zinc stearate was added to the powder after jet mill pulverization, and the addition amount of zinc stearate was 0.12% by weight of the mixed powder, and then it was mixed thoroughly by using a V-mixer.

(6) Magnetic field forming process: a rectangular oriented magnetic field forming machine was used to conduct primary forming of the above-mentioned powder with zinc stearate into a cube with sides of 25 mm at one time in an orientation magnetic field of 1.6 T and a forming pressure of 0.35 ton/cm$^2$; after the primary forming, it was demagnetized in a magnetic field of 0.2 T. In order to prevent the formed body after the primary forming from contacting with air, it was sealed, and then secondary forming was carried out at a pressure of 1.3 ton/cm$^2$ using a secondary forming machine (isostatic forming machine).

(7) Sintering process: each formed body was moved to a sintering furnace for sintering, the sintering was maintained under a vacuum of $5\times10^{-3}$ Pa and at a temperature of 300° C. and 600° C. for 1 hour, respectively; then, sintered at a temperature of 1040° C. for 2 hours; and then Ar gas was passed in to make the air pressure reach 0.1 MPa, and cooled to room temperature.

(8) Grain boundary diffusion treatment process: the sintered body of each group was processed into a magnet with a diameter of 20 mm and a thickness of 5 mm, and the thickness direction is the magnetic field orientation direction, after the surface was cleaned, the raw materials formulated with Tb fluoride were used to coat the magnet through a full spray, and the coated magnet was dried, and the metal with Tb elements was attached to the magnet surface by sputtering in a high-purity Ar gas atmosphere, diffusion heat treatment was carried out at a temperature of 850° C. for 24 hours. Cooled to room temperature.

(9) Heat treatment process: the sintered body was heat treated in high purity Ar gas at a temperature of 500° C. for 3 hours and then cooled to room temperature and taken out.

Effectiveness Example

The magnetic properties and compositions of the R-T-B based permanent magnet materials made in Examples 1-14 and Comparative Examples 1-11 were measured, and the crystalline phase structure of the magnets was observed using a field emission electron probe microanalyzer (FE-EPMA).

(1) Magnetic properties evaluation: The magnetic properties were examined using the NIM-1000011 type BH bulk rare earth permanent magnet nondestructive measurement system in National Institute of Metrology, China. The following Table 2 indicates the magnetic property testing results. In Table 2, "Br" is the residual magnetic flux density, "Hcj" is the intrinsic coercivity, "SQ" is the squareness ratio, and "BHmax" is the maximum energy product.

TABLE 2

| No. | Br (kGs) | Hcj (kOe) | SQ (%) | BHmax(MGoe) |
|---|---|---|---|---|
| Example 1 | 14.51 | 24.4 | 99.0 | 51.0 |
| Example 2 | 14.42 | 25.1 | 99.6 | 50.3 |
| Example 3 | 14.32 | 25.6 | 99.6 | 49.6 |
| Example 4 | 14.49 | 24.3 | 99.5 | 50.8 |
| Example 5 | 14.41 | 25.2 | 99.7 | 50.5 |
| Example 6 | 14.33 | 24.1 | 99.8 | 49.6 |
| Example 7 | 14.45 | 25.5 | 99.8 | 50.3 |
| Example 8 | 14.48 | 24.9 | 99.6 | 50.6 |

TABLE 2-continued

| No. | Br (kGs) | Hcj (kOe) | SQ (%) | BHmax(MGoe) |
|---|---|---|---|---|
| Example 9 | 14.50 | 24.5 | 99.4 | 51.0 |
| Example 10 | 14.49 | 24.5 | 99.5 | 50.7 |
| Example 11 | 14.45 | 24.9 | 99.2 | 50.6 |
| Example 12 | 14.39 | 25.2 | 99.1 | 50.1 |
| Example 13 | 14.42 | 24.3 | 99.5 | 50.6 |
| Example 14 | 14.30 | 25.7 | 99.5 | 49.7 |
| Comparative Example 1 | 14.06 | 16.8 | 88.2 | 47.0 |
| Comparative Example 2 | 13.24 | 26.1 | 99.0 | 42.1 |
| Comparative Example 3 | 14.52 | 21.6 | 99.3 | 51.0 |
| Comparative Example 4 | 14.24 | 23.4 | 97.6 | 49.1 |
| Comparative Example 5 | 14.21 | 23.2 | 99.0 | 48.9 |
| Comparative Example 6 | 14.11 | 24.2 | 97.3 | 47.8 |
| Comparative Example 7 | 13.84 | 25.5 | 99.0 | 46.4 |
| Comparative Example 8 | 14.35 | 23.5 | 99.0 | 49.6 |
| Comparative Example 9 | 14.25 | 23.2 | 98.9 | 49.0 |
| Comparative Example 10 | 14.22 | 23.6 | 99.0 | 49.0 |
| Comparative Example 11 | 14.28 | 25.9 | 91.6 | 48.3 |

From Table 2, it can be seen that:

(1) the R-T-B based permanent magnet materials of the present disclosure have excellent performance with Br≥14.30 kGs and Hcj 24.1 kOe, achieving simultaneous improvement of Br and Hcj (Examples 1-14).

(2) Based on the formulation of the present disclosure, as the amount of raw materials R, Cu, Co, Ti and B is changed, the performance of the R-T-B based permanent magnet materials decreases significantly (Comparative Examples 1-6), (3) During the research, the inventor found that after the addition of a larger amount of Cu and high melting point Ti, part of Ti enters the grain boundary to form a high-Cu-high-Ti phase, which is beneficial to the performance of the R-T-B based permanent magnet materials; however, not all elements with similar properties can form this phase, for example the addition of Ga and Al (Comparative Example 7), and for another example the addition of high melting point metals such as Zr, Mo and W (Comparative Example 8-10), are not able to obtain the R-T-B based permanent magnet materials in the present closure.

(2) Composition determination: the components were determined using a high-frequency inductively coupled plasma emission spectrometer (ICP-OES). The following Table 3 shows the results of the composition testing.

TABLE 3

| Composition test results (wt. %) | | | | | | | | | | | | | | |
|---|---|---|---|---|---|---|---|---|---|---|---|---|---|---|
| No. | Nd | PrNd | Tb | Dy | Cu | Co | Ti | B | Fe | Ga | Al | Zr | Mo | W | Mn |
| Example 1 | 29.0 | / | 1.05 | / | 0.30 | 0.10 | 0.05 | 0.92 | remainder | / | / | / | / | / | / |
| Example 2 | 30.0 | / | 1.05 | / | 0.30 | 0.10 | 0.05 | 0.92 | remainder | / | / | / | / | / | / |
| Example 3 | 30.5 | / | 1.06 | / | 0.30 | 0.10 | 0.05 | 0.92 | remainder | / | / | / | / | / | / |
| Example 4 | 30.0 | / | 1.05 | / | 0.35 | 0.50 | 0.10 | 0.92 | remainder | / | / | / | / | / | / |
| Example 5 | 30.0 | / | 1.07 | / | 0.40 | 0.50 | 0.10 | 0.92 | remainder | / | / | / | / | / | / |
| Example 6 | 30.0 | / | 1.06 | / | 0.45 | 0.50 | 0.10 | 0.92 | remainder | / | / | / | / | / | / |
| Example 7 | 30.0 | / | 1.06 | / | 0.40 | 0.8 | 0.10 | 0.92 | remainder | / | / | / | / | / | / |
| Example 8 | 30.0 | / | 1.07 | / | 0.40 | 1.0 | 0.05 | 0.94 | remainder | / | / | / | / | / | / |
| Example 9 | 30.0 | / | 1.06 | / | 0.40 | 1.0 | 0.10 | 0.94 | remainder | / | / | / | / | / | / |
| Example 10 | 30.0 | / | 1.05 | / | 0.40 | 1.0 | 0.15 | 0.94 | remainder | / | / | / | / | / | / |
| Example 11 | 30.0 | / | 1.05 | / | 0.40 | 1.0 | 0.20 | 0.94 | remainder | / | / | / | / | / | / |
| Example 12 | 30.0 | / | 1.06 | / | 0.40 | 1.0 | 0.10 | 0.95 | remainder | / | / | / | / | / | / |
| Example 13 | 30.0 | / | 1.05 | / | 0.40 | 1.0 | 0.10 | 0.98 | remainder | / | / | / | / | / | / |
| Example 14 | / | 30 | 0.5 | 0.8 | 0.40 | 0.5 | 0.1 | 0.92 | remainder | / | / | / | / | / | / |
| Comparative Example 1 | 28.0 | / | 0.95 | / | 0.30 | 0.10 | 0.05 | 0.92 | remainder | / | / | / | / | / | / |
| Comparative Example 2 | 32.0 | / | 1.06 | / | 0.30 | 0.10 | 0.05 | 0.92 | remainder | / | / | / | / | / | / |
| Comparative Example 3 | 30.0 | / | 1.07 | / | 0.20 | 0.50 | 0.10 | 0.92 | remainder | / | / | / | / | / | / |
| Comparative Example 4 | 30.0 | / | 1.05 | / | 0.50 | 0.50 | 0.10 | 0.92 | remainder | / | / | / | / | / | / |
| Comparative Example 5 | 30.0 | | 1.03 | | 0.5 | 0.30 | 0.25 | 0.92 | remainder | / | / | / | / | / | / |
| Comparative Example 6 | 30.0 | / | 1.06 | / | 0.40 | 0.30 | 0.05 | 0.89 | remainder | / | / | / | / | / | / |
| Comparative Example 7 | 28 | / | 1.07 | / | 0.40 | 0.10 | 0.20 | 0.92 | remainder | 0.30 | 0.20 | / | / | / | / |
| Comparative Example 8 | 30 | / | 1.06 | / | 0.40 | 0.10 | / | 0.92 | remainder | / | / | 0.20 | / | / | / |
| Comparative Example 9 | 30.0 | / | 1.07 | / | 0.40 | 0.10 | / | 0.92 | remainder | / | / | / | 0.20 | / | / |
| Comparative Example 10 | 30.0 | / | 1.06 | / | 0.40 | 0.10 | / | 0.92 | remainder | / | / | / | / | 0.20 | / |
| Comparative Example 11 | / | 29.1 | 0.35 | 0.5 | 0.20 | 2.0 | / | 0.9 | remainder | 0.20 | 0.20 | 0.15 | / | / | 0.03 |

(3) FE-EPMA inspection: the perpendicularly oriented surface of the permanent magnet material was polished and inspected using a field emission electron probe micro-analyzer (FE-EPMA) (Japan Electronics Corporation (JEOL), 8530F). The distribution f Nd, Cu, Ti and other elements in the permanent magnet material was first determined by FE-EPMA surface scanning, and then the content of Cu and Ti in the key phase was determined by FE-EPMA single-point quantitative analysis with the test conditions of acceleration voltage 15 kv and probe beam current 50 nA.

The FE-EPMA inspection was performed on the permanent magnet material produced in Example 7, and the results are shown in Table 4 and FIG. 1 below. Wherein:

FIG. 1 shows the concentration distribution diagrams of Nd, Cu, and Ti, respectively. From FIG. 1, it can be seen that Ti-rich phase exists at the grain boundaries in addition to the diffuse distribution of Ti within the main phase. The Cu content in the Ti-rich phase is also higher than that in the main phase. In FIG. 1, point 1 is the main phase and point 2 is the Ti-rich phase.

Table 4 shows the results of the FE-EPMA single-point quantitative analysis of this Ti-rich phase in FIG. 1. As can be seen from Table 4, in this Ti-rich phase, the Ti content is 1.8 times the Cu content by atomic percentage, and the amount of rare earth is about 21.3 at %. Similarly, during FE-EPMA inspection of other Examples, the presence of a high-Cu-high-Ti phase at grain boundaries can be observed, and the Ti content is 1.5 to 2 times the Cu content by atomic percentage, and a total rare earth amount of 18 to 30 at % (at % is the atomic percentage, specifically the percentage of atomic content of various elements)

TABLE 4

| (at %) | Nd | Tb | Fe | Co | Cu | Ti | B | Phase composition |
|---|---|---|---|---|---|---|---|---|
| Point 1 | 11.4 | 0.2 | 80.6 | 1.03 | 0.06 | 0.02 | 5.90 | $R_2T_{14}B$ |
| Point 2 | 18.0 | 3.2 | 73.2 | 0.98 | 1.48 | 2.72 | 0.33 | High-Cu-high-Ti phase |

Figure 2:
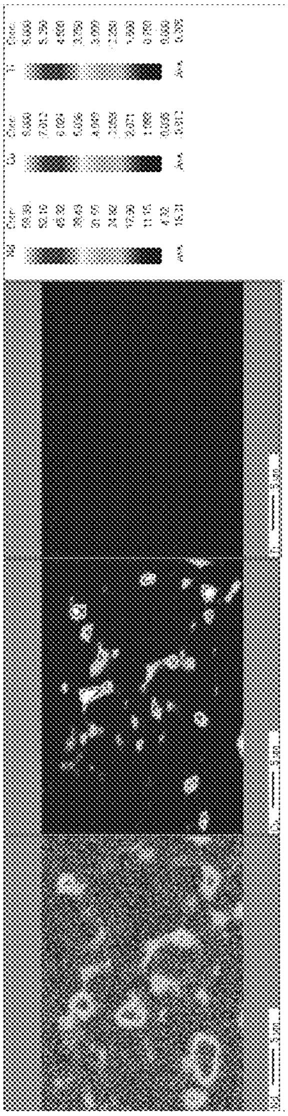
FIG. 2 shows the distribution diagrams of Nd, Cu and Ti elements formed by FE-EPMA surface scan of the permanent magnet material prepared in Comparative Example 3.

FE-EPMA was performed for the Comparative Example 3, and the results are shown in FIG. 2, representing the concentration distribution diagrams of Nd, Cu, and Ti, respectively. From the results, it can be seen that Ti is diffusely distributed within the main phase and no high-Cu-high-Ti phase is formed at the grain boundaries. During the inspection of the other Comparative Examples, no high-Cu-high-Ti phase was observed at the grain boundaries of the permanent magnet materials.

What is claimed is:

1. An R-T-B based permanent magnet material, wherein, the R-T-B based permanent magnet material comprises the following components in percentage by mass:

29.0-32.0 wt. % of R, wherein R comprises RH, and the content of RH is greater than 1 wt. %;

0.30-0.50 wt. % of Cu, not including 0.50 wt. %;

0.10-1.0 wt. % of Co;

0.05-0.20 wt. % of Ti;

0.92-0.98 wt. % of B;

and the remainder being Fe and unavoidable impurities; wherein:

R is a rare-earth element, and R at least comprises Nd;

RH is a heavy rare-earth element, and RH at least comprises Tb;

wherein, the R-T-B based permanent magnet material has a high-Cu-high-Ti phase with composition ratio of $(T_{1-a-b}\text{-}Ti_a\text{—}Cu_b)\text{—}R_y$ at grain boundary of the magnet; wherein: T represents Fe and Co, 1.5b<a<2b, 70 at %<x<82 at %, 18 at %<y<30 at %, a is in the range of 2.50-3 at %, at % refers to the percentage of the atomic content of each element in the R-T-B based permanent magnet material.

2. The R-T-B based permanent magnet material according to claim 1, wherein, the content of Cu is 0.30-0.45 wt. %.

3. The R-T-B based permanent magnet material according to claim 1, wherein, the content of Ti is 0.05 wt. % or 0.10-0.20 wt. %, and wt. % refers to the mass percentage in the R-T-B based permanent magnet material.

4. The R-T-B based permanent magnet material according to claim 1, wherein, RH further comprises Dy.

5. The R-T-B based permanent magnet material according to claim 1, wherein, the content of Co is 0.10 wt. % or 0.50-1.0 wt. %, and wt. % refers to the mass percentage in the R-T-B based permanent magnet material;

or, the content of B is 0.92-0.96 wt. % or 0.94-0.98 wt. %, and wt. % refers to the mass percentage in the R-T-B based permanent magnet material.

6. The R-T-B based permanent magnet material according to claim 1, wherein, the content of R is 29.5-32.0 wt. %;

or, the content of RH is 1.05-1.30 wt. %.

7. The R-T-B based permanent magnet material according to claim 1, wherein, the R-T-B based permanent magnet material comprises the following components:

29.5-32.0 wt. % of R, and the content of RH is 1.05-1.3 wt. %;

0.30-0.45 wt. % of Cu;

0.50-1.0 wt. % of Co;

0.10-0.20 wt. % of Ti;

0.92-0.96 wt. % of B;

and wt. % refers to the mass percentage in the R-T-B based permanent magnet material.

8. An electronic component in a motor comprising the R-T-B based permanent magnet material according to claim 1.

9. A preparation method for the R-T-B based permanent magnet material according to claim 1, wherein, the preparation method for the R-T-B based permanent magnet material comprises the following steps: the molten liquid of a raw material composition of the R-T-B based permanent magnet material is subjected to casting, decrepitation, pulverization, forming, sintering, and grain boundary diffusion treatment, and the R-T-B based permanent magnet material is obtained; wherein: the heavy rare-earth elements in the grain boundary diffusion treatment comprise Tb;

wherein, the raw material composition of the R-T-B based permanent magnet material comprises the following components in percentage by mass:

29.0-31.5 wt. % of R, and R comprises RH, and the content of RH is 0.1-0.9 wt. %;

0.30-0.50 wt. % of Cu, not including 0.50 wt. %;

0.10-1.0 wt. % of Co;

0.05-0.20 wt. % of Ti;

0.92-0.98 wt. % of B;

and the remainder being Fe and unavoidable impurities; wherein:

R is a rare-earth element, and R at least comprises Nd;

RH is a heavy rare-earth element.

10. The preparation method for the R-T-B based permanent magnet material according to claim 9, wherein, the molten liquid of the raw material composition of the R-T-B based permanent magnet material is prepared as follows: melting in a high-frequency vacuum induction melting furnace;

or, the process of the casting is carried out as the following steps: cooling in an Ar atmosphere at a rate of $10^{2}$° C./sec-$10^{4}$° C./sec;

or, the process of the decrepitation is carried out as the following steps: being subjected to hydrogen absorption, dehydrogenation and cooling treatment;

or, the method of the forming is a magnetic field forming method or a hot pressing and hot deformation method;

or, the process of the sintering is carried out as the following steps: preheating, sintering, and cooling under vacuum conditions;

or, the grain boundary diffusion treatment is carried out as the following steps: substance containing Tb is attached to the surface of the R-T-B based permanent magnet material by evaporating, coating or sputtering, and then diffusion heat treatment is carried out; the substance containing Tb is Tb metal, a compound or an alloy containing Tb;

or, after the grain boundary diffusion treatment, heat treatment is further performed.

11. The preparation method for the R-T-B based permanent magnet material according to claim 10, wherein, the vacuum degree of the melting furnace is $5\times10^{-2}$ Pa; and the temperature of the melting is 1500° C. or less;

or, the hydrogen absorption is carried out under the condition of a hydrogen pressure of 0.15 MPa; the pulverization is a jet mill pulverization, the pressure in the pulverizing chamber of the jet mill pulverization is 0.38 MPa, and the time for the jet mill pulverization is 3 hours;

or, the temperature of preheating is 300-600° C., and the time of preheating is 1-2 h; the temperature of sintering is 900° C.-1100° C., and the time of sintering is 2 h;

or, the temperature of the diffusion heat treatment is 800-900° C., and the time of the diffusion heat treatment is 12-48 h;

or, the temperature of the heat treatment is 450-550° C., and the time of the heat treatment is 3 h.

* * * * *